(12) United States Patent
Yao

(10) Patent No.: US 8,074,865 B2
(45) Date of Patent: Dec. 13, 2011

(54) GRADIENT POLYCRYSTALLINE CUBIC BORON NITRIDE MATERIALS AND TOOLS INCORPORATING SUCH MATERIALS

(75) Inventor: Xian Yao, Sandy, UT (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 12/823,589

(22) Filed: Jun. 25, 2010

(65) Prior Publication Data

US 2010/0288817 A1 Nov. 18, 2010

Related U.S. Application Data

(63) Continuation of application No. 11/097,476, filed on Apr. 1, 2005, now abandoned.

(60) Provisional application No. 60/558,836, filed on Apr. 2, 2004.

(51) Int. Cl.
*B23K 20/12* (2006.01)
*B32B 19/00* (2006.01)

(52) U.S. Cl. ........ 228/112.1; 228/2.1; 228/2.3; 228/2.5; 428/698

(58) Field of Classification Search ............... None
See application file for complete search history.

(56) References Cited

U.S. PATENT DOCUMENTS

| | | |
|---|---|---|
| 4,016,736 A | 4/1977 | Carrison et al. |
| 4,034,066 A | 7/1977 | Strong et al. |
| 4,082,185 A | 4/1978 | Strong |
| 4,129,052 A | 12/1978 | Bieberich |
| 4,188,194 A | 2/1980 | Corrigan |
| 4,289,503 A | 9/1981 | Corrigan |
| 4,389,223 A | 6/1983 | Corrigan |
| 4,518,659 A | 5/1985 | Gigl et al. |
| 4,527,998 A | 7/1985 | Knemeyer |
| 4,690,691 A | 9/1987 | Komanduri |
| 4,772,294 A | 9/1988 | Schroeder |
| 4,875,967 A | 10/1989 | Mishima et al. |
| 4,892,791 A | 1/1990 | Watanabe et al. |
| 4,944,773 A | 7/1990 | Rue et al. |
| 5,049,164 A | 9/1991 | Horton et al. |
| 5,106,792 A | 4/1992 | Corrigan |
| 5,137,772 A | 8/1992 | Watanabe et al. |
| 5,173,091 A | 12/1992 | Marek |
| 5,197,651 A | 3/1993 | Nakamura et al. |
| 5,211,726 A | 5/1993 | Slutz et al. |
| 5,244,368 A | 9/1993 | Frushour |
| 5,271,749 A | 12/1993 | Rai et al. |
| 5,272,940 A | 12/1993 | Diskin |
| 5,330,611 A | 7/1994 | Doll |
| 5,396,965 A | 3/1995 | Hall et al. |
| 5,435,815 A | 7/1995 | Ikegaya et al. |
| 5,466,269 A | 11/1995 | Corrigan et al. |
| 5,503,913 A | 4/1996 | König et al. |
| 5,510,193 A | 4/1996 | Cerutti et al. |
| 5,697,994 A | 12/1997 | Packer et al. |
| 5,722,803 A | 3/1998 | Battaglia et al. |
| 6,063,502 A | 5/2000 | Sue et al. |
| 6,090,476 A | 7/2000 | Thysell et al. |
| 6,170,368 B1 | 1/2001 | Oles et al. |
| 6,193,001 B1 | 2/2001 | Eyre et al. |

(Continued)

*Primary Examiner* — Angela Ortiz
*Assistant Examiner* — Nicole Gugliotta
(74) *Attorney, Agent, or Firm* — Christie, Parker & Hale, LLP

(57) ABSTRACT

Gradient polycrystalline cubic boron nitride (PCBN) materials are provided as well as tools incorporating such materials.

31 Claims, 4 Drawing Sheets

U.S. PATENT DOCUMENTS

| | | |
|---|---|---|
| 6,253,864 B1 | 7/2001 | Hall |
| 6,258,139 B1 | 7/2001 | Jensen |
| 6,336,950 B1 | 1/2002 | Koizumi et al. |
| 6,346,689 B1 | 2/2002 | Willis et al. |
| 6,361,873 B1 | 3/2002 | Yong et al. |
| 6,383,624 B1 | 5/2002 | Söderberg et al. |
| 6,398,815 B1 | 6/2002 | Pope et al. |
| 6,451,442 B1 | 9/2002 | Sue et al. |
| 6,454,027 B1 | 9/2002 | Fang et al. |
| 6,460,637 B1 | 10/2002 | Siracki et al. |
| 6,517,583 B1 | 2/2003 | Pope et al. |
| 6,599,062 B1 | 7/2003 | Oles et al. |
| 6,610,095 B1 | 8/2003 | Pope et al. |
| 6,648,206 B2 | 11/2003 | Nelson et al. |
| 6,696,137 B2 | 2/2004 | Yong |
| 6,790,497 B2 | 9/2004 | Massa et al. |
| 6,840,424 B2 | 1/2005 | Sung |
| 6,884,155 B2 | 4/2005 | Sung et al. |
| 6,884,499 B2 | 4/2005 | Penich et al. |
| 6,915,866 B2 | 7/2005 | Middlemiss |
| 6,962,751 B2 | 11/2005 | Fukui et al. |
| 7,530,486 B2 * | 5/2009 | Flak et al. .................. 228/112.1 |
| 2004/0188266 A1 | 9/2004 | Corcoran |

* cited by examiner

US 8,074,865 B2

GRADIENT POLYCRYSTALLINE CUBIC BORON NITRIDE MATERIALS AND TOOLS INCORPORATING SUCH MATERIALS

CROSS-REFERENCE TO RELATED APPLICATIONS

This application is a continuation of U.S. application Ser. No. 11/097,476, filed Apr. 1, 2005 now abandoned, and is based upon and claims priority on U.S. Provisional Application No. 60/558,836, filed on Apr. 2, 2004, the contents of which are fully incorporated herein by reference.

BACKGROUND OF THE INVENTION

The present invention is directed to functionally gradient polycrystalline cubic boron nitride materials, to tools incorporating such materials.

Polycrystalline cubic boron nitride has been used extensively as a cutting surface in various cutting tools. Polycrystalline cubic boron nitride (PCBN) is formed by placing cubic boron nitride grains, a second phase and a binder phase within a refractory metal enclosure and then sintering the enclosure with its contents at high pressure and high temperature (HPHT) conditions for forming the PCBN. PCBN materials may be tailored to either provide better strength, better toughness, better chemical wear, or better thermal stability. However, as the magnitude of any of these properties is increased, the magnitudes of the remaining properties may be decreased. To overcome this problem, PCBN material layers which have been used in cutting tools, have in many instances, been coated with a thin film, such as $Al_2O_3$ or TiN, which is more chemically and thermally stable than PCBN during severe cutting conditions. These films reduce the initial chemical wear and the mechanical wear of the PCBN. The problem however with these coatings is that they tend to debond, flake off or wear off from the PCBN layer. This is especially prevalent during machining with a coated PCBN layer.

SUMMARY OF THE INVENTION

Polycrystalline cubic boron nitride materials are provided as well as tools incorporating such materials. In one exemplary embodiment, a polycrystalline cubic boron nitride material is provided having a first layer of polycrystalline cubic boron nitride formed from cubic boron nitride grains, and a second layer of polycrystalline cubic boron nitride bonded to the first layer, where the second layer is formed from cubic boron nitride grains which are coarser than the cubic boron nitride grains forming the first layer. In a further exemplary embodiment, a third layer of polycrystalline cubic boron nitride is formed from cubic boron nitride grains which are finer than the grains of cubic boron nitride forming the second layer. The second layer may be sandwiched between the first and third layers. Moreover, the first and third layers may be made of the same material. Furthermore, the first and third layers may have the same type of cubic boron nitride and the same second phase compositions. In another exemplary embodiment, the first and third layers may include a ceramic binder phase.

In a further exemplary embodiment, a third layer of polycrystalline cubic boron nitride may be formed from cubic boron nitride grains which are coarser than the grains of cubic boron nitride forming the first layer. With this embodiment, the first layer may be sandwiched between the second and third layers. Furthermore, the second and third layers may include a ceramic second phase and a binder phase. Moreover, the second and third layers may be made of the same material. In addition, the second and third layers may include the same type of cubic boron nitride and the same second phase compositions. With any of the aforementioned exemplary embodiments, at least one of the layers may include a ceramic binder phase.

In another exemplary embodiment, a polycrystalline cubic boron nitride material is provided having a first layer of polycrystalline cubic boron nitride formed from cubic boron nitride grains and a second phase material, and a second layer of polycrystalline cubic boron nitride bonded to the first layer, where the second layer is formed from cubic boron nitride grains having the same size as the grains forming the first layer. The second layer may include a second phase material different from the second phase material of the first layer. In one exemplary embodiment, the first layer includes from about 50% to about 80% by volume cubic boron nitride, a binder phase and a ceramic phase, where at least one of the binder and ceramic phases forms the second phase of the first layer. In a further exemplary embodiment, the second layer includes from about 80% to about 95% by volume cubic boron nitride, a metallic second phase and a binder phase.

In another exemplary embodiment, a friction stir welding tool is provided having a base formed of a first material having cubic boron nitride grains, and a pin extending from the base. In the exemplary embodiment, the pin is formed from a second material including cubic boron nitride grains, where one of the first and second materials includes cubic boron nitride grains that are coarser than the cubic boron nitride grains of the other of the first and second materials. In another exemplary embodiment tool, the first and second materials include cubic boron nitride grains in the range of about 80% to about 95% by volume. In yet a further exemplary embodiment, each of the first and second materials includes at least one of a carbide and a nitride, and at least one of a ceramic and an oxide phase. In another exemplary embodiment, the second material includes cubic boron nitride grains having grain sizes in the range of about 10 microns to about 50 microns, and the first material includes cubic boron nitride grains having grains sizes in the range of about 2 microns to about 30 microns. In a further exemplary embodiment, the first material may include a metallic rich second phase. Furthermore the cubic boron nitride grains of the first material may be coarser than the cubic boron nitride grains of the second material. Alternatively, the cubic boron nitride grains of the first material may be finer than the cubic boron nitride grains of the second material.

In another exemplary embodiment, a friction stir welding tool is provided including a base formed of a first material including cubic boron nitride grains and a second material including cubic boron nitride grains, and a pin extending from the base, the pin formed from the second material, where one of the first and second materials cubic boron nitride grains are coarser than the cubic boron nitride grains of the other of the first and second materials. In a further exemplary embodiment, the base includes a first portion including the first material and a second portion including the second material. The second portion may be a layer adjacent the first portion and the pin may extend from the second portion. The cubic boron nitride grains forming the second material may be coarser than the cubic boron nitride grains forming the first material. The second material may include cubic boron nitride grains in the range of about 80% to about 95% by volume.

In an exemplary embodiment the second material includes at least one of a carbide and a nitride, and at least one of a ceramic and an oxide phase. Furthermore, the second material cubic boron nitride grains may have grain sizes in the range of about 10 microns to about 50 microns, and the first material cubic boron nitride grains may have grain sizes in the range of about 2 microns to about 30 microns. The first material may include cubic boron nitride grains in the range of about 50% to about 80% by volume.

In a further exemplary embodiment, the pin and second portion may be integrally formed and the pin with second portion may be sintered to the first portion. In another exemplary embodiment, the second portion is concentric with the first portion. The first portion may circumferentially surround the second portion, and the pin may extend from the second portion. In yet another exemplary embodiment, the pin may be cylindrical having a diameter. The second portion may also be cylindrical having a diameter. The diameter of the second portion may be greater than the diameter of the pin. In another exemplary embodiment, the diameter of the second portion may be the same as the diameter of the pin.

The first material may have a higher cubic boron nitride content than the first material. The second material may have cubic boron nitride grains in the range of about 80% to about 95% by volume. Furthermore, the second material may included at least one of a carbide and a nitride, and at least one of a ceramic and an oxide phase.

Figure 1:
FIGS. 1-4 are partial cross-sectional schematic views of exemplary embodiment multilayered PCBN composite material of the present invention.

DESCRIPTION OF EXEMPLARY
EMBODIMENTS OF THE INVENTION

The present invention provides for functionally gradient polycrystalline cubic boron nitride (PCBN) material and/or material composites which can be tailored for optimal combinations of strength, toughness, chemical wear and thermal stability, to tools incorporating such materials, and to methods of making the same. The exemplary embodiment materials may be used to form, or as part of, cutting tools or other types of tools subjected to wear.

To prepare the functionally gradient PCBN materials, different layers of cBN may be used in particulate form along with a binder. In an exemplary embodiment, any of the layers can be in a high shear compaction (HSC™) form which is well known in the art and is, for example, described in U.S. Pat. Nos. 5,766,394; 6,193,001 and 6,325,165. In such case, the high shear compaction layers may need to be heated in a vacuum to remove the organic binders. Whether using particulate stock feeds or high shear compaction layer(s), the layers of materials are sealed in an HPHT cell such as a refractory material cell and are subjected to HPHT PCBN sintering conditions for forming the functionally gradient PCBN material. Applicant was able to obtain improved bonding between the PCBN layers when using high shear compaction layers.

Exemplary inventive PCBN material may be formed in a blank which can be cut and ground or finished to a desired shape and dimension. In an alternate exemplary embodiment, a substrate such as a cemented WC—Co substrate may also be added to the cell such that a compact, e.g., a cutting element, is formed having a WC—Co substrate and a functionally gradient layer of PCBN material. In other words, the inventive materials of the present invention may be used as self standing cutting tool materials or may be HPHT sintered on to a cemented WC—Co substrate to form a cutting element or tool.

In one exemplary embodiment, a thin layer of $Al_2O_3$ is sintered during the HPHT process on to a PCBN matrix resulting in a PCBN layer having increased chemical wear resistance. In an alternate exemplary embodiment, a fine TiCN-rich material and/or a PCBN/TiCN—Al composite is HPHT sintered on to a coarse grain PCBN base achieving increased thermal stability and increased toughness. In yet a further exemplary embodiment, different cubic boron nitride (cBN) grain sizes and second phase materials are mixed for obtaining a PCBN material layer having tailored hardness and toughness. In other exemplary embodiments, including but not limited to the aforementioned exemplary embodiments, coarse cBN grains having a size in the range of about 2 to 30 microns are selected as necessary for obtaining the desired properties.

It should be noted that the terms "coarse" and "fine" when used in reference to grain sizes are relative terms and should be interpreted such that a material having coarser grains has a median or an average grain size that is greater than the median or average grain size, respectively, of material having finer grains.

Following are provided some further exemplary embodiment material composites of the present invention.

COMPOSITE EXAMPLE A

An exemplary embodiment multilayered PCBN composite with similar PCBN compositions but different cBN grain sizes in each layer is provided, as for example shown in FIG. 1. A fine-grain PCBN layer 10 with desirable thickness is HPHT sintered onto a coarse-grain PCBN center core 12. All layers are composed of similar or the same cBN and 2nd phase types and compositions. An exemplary embodiment composite may in one exemplary embodiment have three layers as shown in FIG. 1 where the fine-grain layers 10 sandwich the coarse-grain center layer 12, or only a single fine-grain layer 10 may be attached to one side of the a coarse-grain layer 12. Such an exemplary PCBN composite will be beneficial in applications demanding cutting tools having high toughness desirable for interrupted machining. Owing to the fine-grain PCBN microstructure of the outer layer(s), the outer cutting edges of this exemplary embodiment PCBN composite cutting tool possess higher strength and thus, are more resistant to wear allowing the tool to maintain a sharp edge achieving a higher surface finish through out the tool life.

COMPOSITE EXAMPLE B

Figure 2:
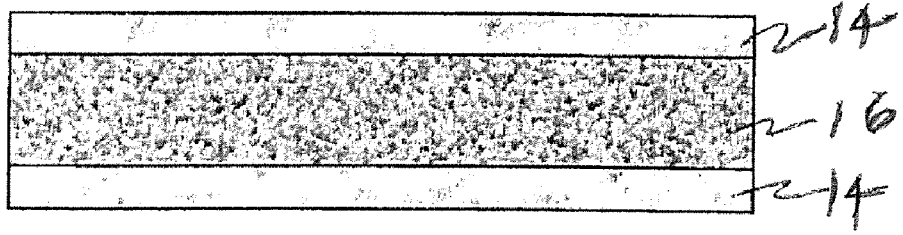

This exemplary embodiment material composite, shown in FIG. 2, is also a multilayered PCBN composite with similar PCBN compositions but different cBN grain sizes in each layer. This exemplary embodiment material is opposite to the material described in Example A in that a coarse-grained PCBN layer 14 with desirable thickness is HPHT sintered onto a fine-grain PCBN center core 16 with all layers having similar or the same cBN and 2nd phase types and compositions.

An exemplary embodiment composite may in one exemplary embodiment have three layers as shown in FIG. 2 where the coarse-grain layers 14 sandwich the fine-grain core or center layer 16 or only a single coarse-grain outer layer 14 attached to one side of a fine-grain inner layer 16. This multilayered PCBN composite when used as a cutting tool will have a good combination of edge toughness and bulk strength which is beneficial when the cutting tool is used in rough machining operations providing for large material removal, where surface finish is less critical. This exemplary embodiment PCBN composite cutting tool will have an improved tool life in interrupted machining conditions.

In Examples A and B, the cBN contents in all PCBN layers can range from 50% to 95% by volume balanced with a metallic phase and a ceramic phase. The metallic and ceramic phases may in an exemplary embodiment be Co, Ni, Fe, WC, carbides and/or nitrides, as for example AlN, TiN, TiC, TiCN, carbides and/or nitrides of the IVB, VB and VIB elements of the Periodic Table of Elements. An oxide phase such as $Al_2O_3$, $SiO_2$, $TiO_2$ may also be present in the layers. The cBN grain size in the fine PCBN layer(s) in an exemplary embodiment ranges from less than 1 micron to about 10 microns and the cBN grain size in the coarser PCBN layer(s) ranges from about 2 to about 30 microns.

COMPOSITE EXAMPLE C

Figure 3:
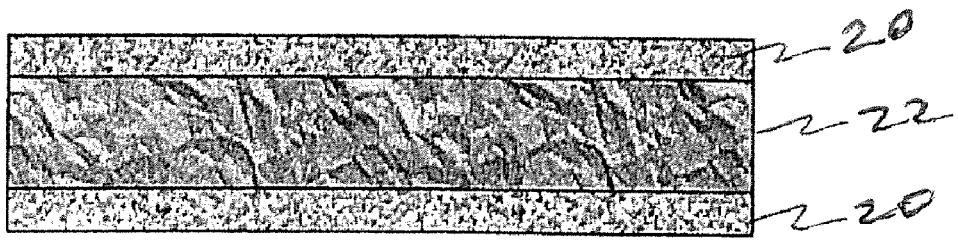

This exemplary embodiment material composite is a multilayered composite with different layers having different PCBN compositions and/or sizes, as for example shown in FIG. 3. An exemplary embodiment includes a cBN-ceramic composite (e.g., a cBN layer with a ceramic binder phase) outer layer 20 and a high cBN volume and coarser cBN grain inner layer 22. An exemplary embodiment composite may in one exemplary embodiment have three layers as shown in FIG. 3, where the cBN-ceramic composite outer layers 20 sandwich the high cBN volume coarser cBN grain inner or center layer 22, or may have only a single cBN-ceramic composite outer layer 20 attached to one side of the a high cBN volume coarser-grain inner layer 22.

In an exemplary embodiment material, the cBN content in the outer PCBN (cBN-ceramic composite) layers 20 ranges from about 50% to 80% by volume balanced with a metallic phase and a ceramic phase. The metallic phase may be Co, WC, Ni, Fe. The ceramic phase may include a carbide and/or nitride such as AlN, TiN, TiC, TiCN, and/or a carbide and/or nitride of the IVB, VB, and VIB elements of the Periodic Table of Elements, and combinations thereof. An oxide phase may be also present in the layers and may be a phase such as $Al_2O_3$, $SiO_2$, $TiO_2$. The inner PCBN layer 22 includes a higher volume cBN which in an exemplary embodiment is in a range of about 60% to about 95% by volume. The inner layer may be selectively balanced with a Co—WC rich 2nd phase. In other words, more than 50% by volume of the second phase comprises of Co—WC. Stated differently, when a phase is said to be a particular material rich, such phase comprises more than 50% of the particular material. The cBN grain size in the outer PCBN layers in an exemplary embodiment range from less than 1 micron to about 10 microns and the cBN grain size in the inner layer ranges from about 2 to about 30 microns.

The exemplary material of this example when used as a cutting tool will have improved machining efficiency and toughness but still maintain a high chemical tool wear resistance. Moreover, when the inner PCBN layer is made of cBN and Co—WC metallic phase and the outer layer(s) is made of cBN and a ceramic binder phase, a compressive favorable residual stress to the outer PCBN layer will develop which will increase the tool life by delaying the crack nucleation and propagation. Furthermore, the combination of different cBN grain sizes and 2nd phase types incorporated in this exemplary material benefits not only from the different cBN grains sizes, as in Examples A and B, but also from different 2nd phases.

Currently commercially available single-layer cBN-ceramic composites bonded on a carbide substrate which are used as cutting surfaces perform well in resisting chemical or diffusion wear but need more mechanical toughness and strength to achieve a higher cutting efficiency. Using a multilayered composite, such as the exemplary composite material of this example provides for improved mechanical toughness and strength while retaining chemical and diffusion wear resistance.

COMPOSITE EXAMPLE D

Figure 4:
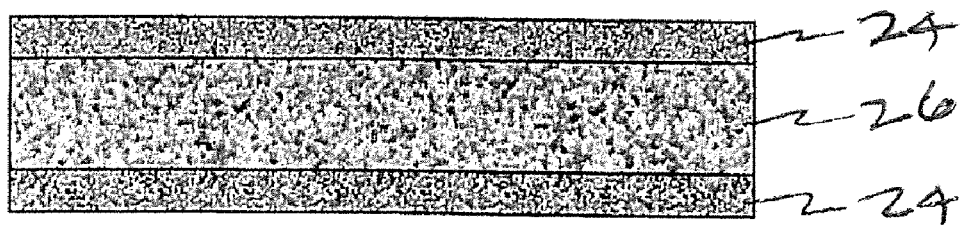

This exemplary embodiment material composite is also a multilayered composite with different layers having different PCBN compositions, as for example shown in FIG. 4. This exemplary embodiment material composite is formed from comparable cBN grain-sized PCBN layers. However, different 2nd phase materials can also be HPHT sintered to the layers to form a cutting tool with a high chemical-tool-wear resistant outer layer or layers and very high mechanical strength inner layer. This exemplary embodiment composite may in one exemplary embodiment have two outer layers 24 sandwiching an inner layer 26 as shown in FIG. 4 or have an outer layer over an inner layer.

In an exemplary embodiment composite of this example, the cBN content in the outer PCBN layer(s) 24 ranges from about 50% to about 80% by volume balanced with a binder phase and a ceramic phase. The binder phase or the ceramic phase may form the second phase of the material. The binder phase may be Co, Ni, Fe, WC. The ceramic phase may include a carbide and/or nitride such as AlN, TiN, TiC, TiCN and/or a carbide and/or nitride of the IVB, VB and VIB elements of the Periodic Table of Elements, and combinations thereof. An oxide phase may also be present in the outer PCBN layer(s) and may be a phase such as $Al_2O_3$, $SiO_2$, $TiO_2$. The inner PCBN layer 26 incorporates a similar cBN grain size as the outer layer(s) 24, but has a higher cBN content. In an exemplary embodiment the inner layer has a cBN content in the range from about 80% to 95% by volume which can be selectively balanced with a Co—WC rich metallic 2nd phase. The cBN grain sizes for both layers in an exemplary embodiment ranges from less than 1 micron to about 10 microns.

COMPOSITE EXAMPLE E

Any of the aforementioned PCBN composites may be bonded or formed over a substrate, such as a cemented tungsten carbide substrate forming compacts. Such compacts have enhanced electro-discharge-machining (EDM) cut-ability and braze-ability allowing for brazing onto a variety of metallic tool carriers. Conventional PCBN materials without substrates typically do not have good EDM cut-ability or braze-ability.

Figure 5:
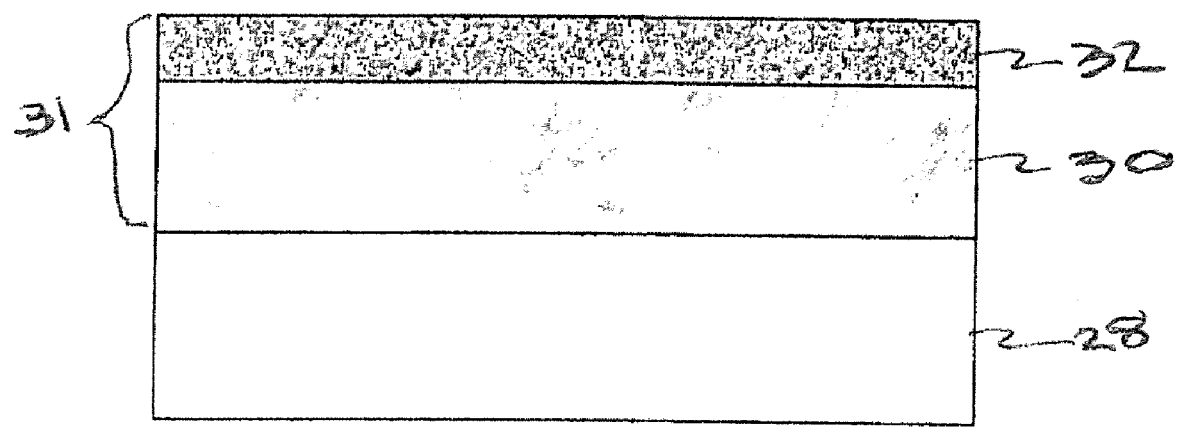
FIG. 5 is a partial cross-sectional schematic view of an exemplary embodiment compact of the present invention having an exemplary embodiment functionally gradient PCBN composite material over a substrate.

In an exemplary embodiment, to ensure better EDM cut-ability with conventional EDM setups, the PCBN composite may be formed from cBN having a grain size less than 10 microns. In one exemplary embodiment, as shown in FIG. 5, a two-layer PCBN composite 31, having an inner layer 30 and an outer layer 32 is formed over WC—Co substrate 28. In an exemplary embodiment, the cBN content for each of the PCBN layers formed over the substrate includes about 50% to about 95% volume cBN balanced with metallic phase and a binder phase. The metallic phase may be Co, Ni, Fe, WC. The binder phase may be included a carbide and/or nitride such as AlN, TiN, TiC, TiCN, and/or a carbide and/or nitride of the IVB, VB and VIB elements of the Periodic Table of Elements, and combinations thereof. An oxide phase such as $Al_2O_3$, $SiO_2$, $TiO_2$ may also be present in the layers.

Figure 6:
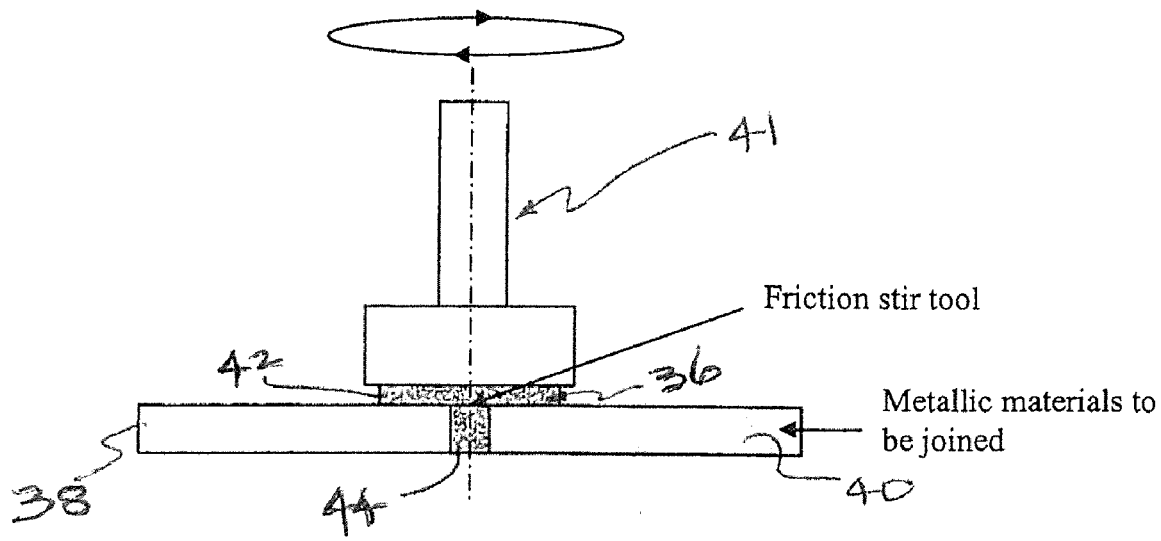
FIG. 6 is a partial cross-sectional schematic view of friction welding apparatus joining two pieces of metal.

The exemplary embodiment composite materials of the present invention may be also used to form various cutting tools, including cutting elements or inserts which are mounted on earth boring bits. However, the exemplary materials also have application in other types of tools, such as wear tools, as for example friction stir welding (FSW) tools. An FSW tool 36 of a FSW apparatus 41 is shown in FIG. 6. An FSW tool 36 as shown in FIG. 6 mechanically joins two metallic materials 38, 40 by significantly plastic deforming and mixing the materials being joined at sub-melting temperatures. The FSW tool is driven to rotate by an FSW spindle 41 which "stirs" the materials to be joined. The FSW tool has a base 42 from which extends a pin 44 which penetrates the materials to be joined and does the stirring. Because of different wear mechanisms induced by different geometries, linear speeds, and temperatures of the FSW tool, different localized failure modes are observed on different parts of the tool. Use of the inventive PCBN materials to form the FSW tool will result in a tool having enhanced resistance to the various tool wear mechanisms and increased tool life. Following are some exemplary embodiment FSW tools formed with the inventive material(s).

FSW EXAMPLE A

Figure 7:
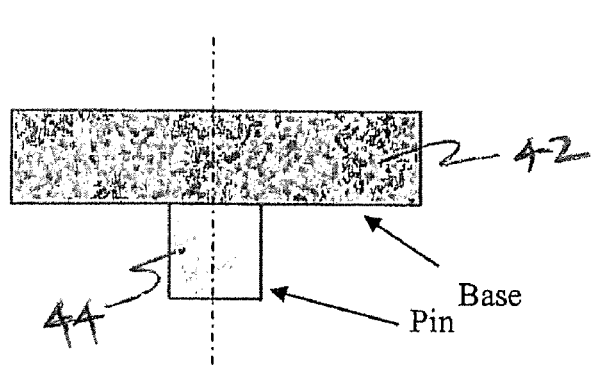
FIGS. 7-11 are cross-sectional schematic views of exemplary embodiment friction welding tools incorporating exemplary embodiment functionally gradient PCBN materials according to principles of the present invention.

In this example, shown in FIG. 7, an FSW tool is made with a coarse grain-sized PCBN pin 44 and a finer grain-sized PCBN base 42 so that a combination of a higher toughness pin with a higher strength base is achieved. The cBN content in both the pin and base in an exemplary embodiment ranges from about 80% to about 95% by volume. The cBN content is balanced with carbides and/or nitrides such as AlN, TiN, TiC, TiCN, carbides and/or nitrides of the IVB, VB and VIB elements of the Periodic Table of Elements and a ceramic or oxide phase such as $Al_2O_3$, $SiO_2$, $TiO_2$. In an exemplary embodiment, cBN grain size for the pin ranges from about 10 to about 50 microns and from about 2 to about 30 microns for the base. If a fine cBN grain and a metallic-rich 2nd phase PCBN composite is chosen for the base, a favorable compressive stress is generated in the pin which will delay the onset of mechanical wear damage, and thus, prolong the tool life.

FSW EXAMPLE B

Figure 8:
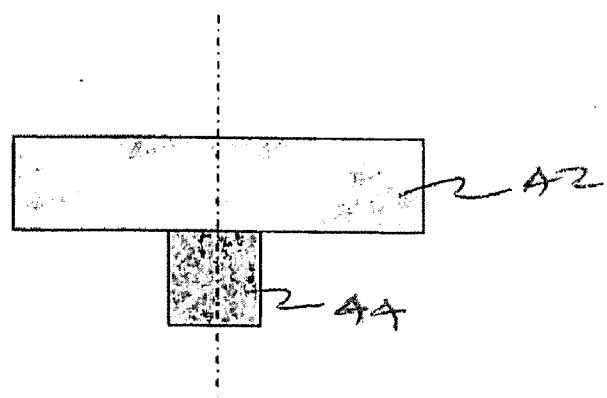

In this example, an FSW tool is provided made with a coarse PCBN grade base and finer PCBN pin combination, as shown in FIG. 8. This exemplary FSW tool has greater toughness at the base 42 and increased wear resistance at the pin 44 due to pin's higher mechanical strength. In this example, the cBN content in both the pin and base ranges from about 80% to 95% by volume balanced with a ceramic or oxide phase such as $Al_2O_3$, $SiO_2$, $TiO_2$, carbides and/or nitrides such as AlN, TiN, TiC, TiCN, and carbides and/or nitrides of the IVB, VB and VIB elements of the Periodic Table of Elements. In an exemplary embodiment, cBN grain size for the pin ranges from about 2 to about 30 microns and from about 10 to about 50 microns for the base.

FSW EXAMPLE C

Figure 9:
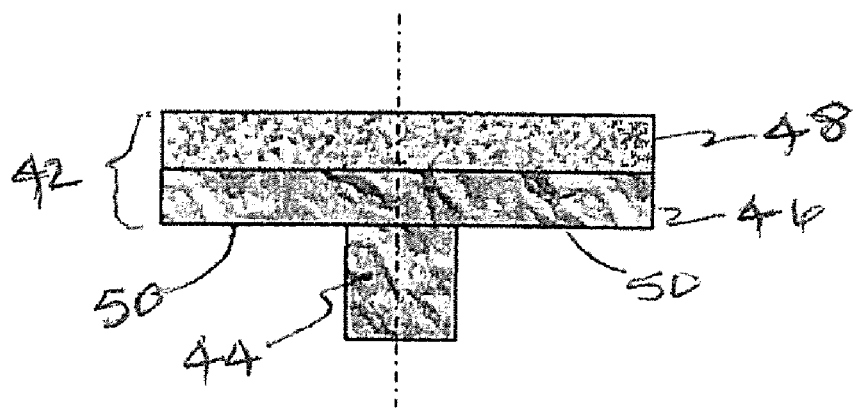

In this example as shown in FIG. 9, the FSW has a pin 44 and a layer 46 of the base 42 from which the pin extends made from a coarse and high volume cBN grade. A second layer 48 of the base adjacent layer 46 and opposite the pin 44 is made with a finer cBN and ceramic second-phase composite. The layer 46 with pin 44 is HPHT-sintered to the second layer 48. This FSW tool has a stronger and tougher PCBN grade forming the pin and the surface 50 of the base layer 46 which will be in contact with the materials to be welded during the friction stir process. This FSW tool will have reduced heat losses from the FSW tool base to the spindle because of the lower CBN content in the base layer in contact with the spindle, consequently, increasing the FSW tool welding efficiency. In an exemplary embodiment, the cBN content in the pin and layer 46 of the base interfacing with the pin ranges from about 80% to about 95% by volume balanced with carbides and/or nitrides such as AlN, TiN, TiC, TiCN, carbides and/or nitrides of the IVB, VB and VIB elements of the Periodic Table of Elements, and with a ceramic or oxide phase such as $Al_2O_3$, $SiO_2$, $TiO_2$. In the exemplary embodiment, the cBN grain size in the pin and layer 46 ranges from about 10 to about 50 microns. The cBN content of the second layer 48 of the base, not in contact with the welded metals, ranges from about 50% to about 80% by volume and has a grain size from about 2 to 30 microns.

FSW EXAMPLE D

Figure 10:
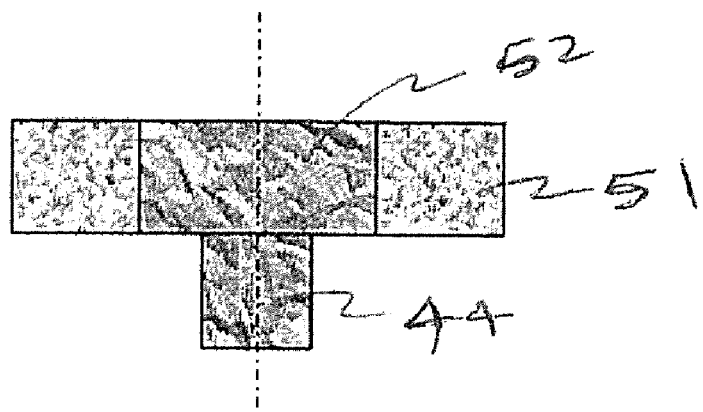
Figure 11:
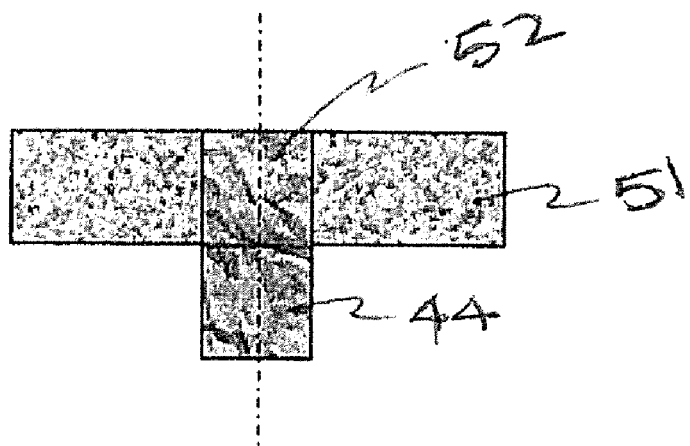

FSWs may also be formed from different PCBN grades which are HPHT-sintered concentrically so that desirable mechanical and thermal properties from the different PCBN grades can be optimized for different FSW requirements, as for example the requirements of the center pin, the portion of the base surrounding the pin, and the circumferential, or ring portion of the base. For example, as shown in FIGS. 10 and 11, the FSW tool base 42 may have an outer ring portion 51 surrounding a surrounded portion 52 from which extends the pin 44. In the exemplary embodiment shown in FIG. 10, the base surrounded portion 52 has a diameter greater than the pin. In the exemplary embodiment shown in FIG. 11, the base surrounded portion 52 has a diameter equal to the diameter of the pin 44. In an exemplary embodiment, the base surrounded portion 52 and pin have a higher cBN content than the ring portion 51. In another exemplary embodiment, the pin and the surrounded portion 52 may be integrally formed. Owing to the different thermal expansion coefficients of the different portions of these exemplary FSW tools and the temperature gradients to which they are subjected, favorable thermal stresses may develop which may apply beneficial compressive radial stresses towards to the center pin, therefore, delaying the mechanical wear damage and prolonging the tool life.

In the examples shown in FIGS. 10 and 11, the cBN content of the outer PCBN ring portion 51 ranges from about 50% to about 80% by volume balanced with carbides and/or nitrides such as AlN, TiN, TiC, TiCN, carbides and/or nitrides of the IVB, VB and VIB elements of the Periodic Table of Elements, a metallic phase such as Co, Ni, Fe, WC, and a ceramic or oxide phase such as $Al_2O_3$, $SiO_2$, $TiO_2$. The cBN content in the base surrounded portion 52 and pin 44 is in the range from about 60% to about 95% by volume, and is balanced with a ceramic binder phase with substantially less metal inclusions.

In an exemplary embodiment, cBN grain size in the outer PCBN ring portion 51 ranges from about 2 to 30 microns and the cBN grain size in the surrounded portion 52 and pin 44 ranges from about 10 to about 50 microns.

In other exemplary embodiments, the base surrounded portion 52 may be made from multiple PCBN layers forming a composite. In further exemplary embodiments, such a composite may be any of the aforementioned exemplary PCBN composites. Any of the aforementioned exemplary embodiment FSW tools may be integrally formed using well known sintering methods.

What is claimed is:

1. A friction stir welding (FSW) tool comprising:
   a spindle;
   a base coupled to the spindle; and
   a pin extending from the base for stirring materials being welded by said FSW tool, wherein at least a portion of the base comprises a first high pressure high temperature (HPHT) sintered polycrystalline cubic boron nitride (PCBN) material and wherein the pin comprises a second HPHT sintered PCBN material, wherein the first PCBN material has a composition different from the second PCBN material.

2. The FSW tool of claim 1 wherein the second PCBN material comprises coarser cubic boron nitride (cBN) grains than the first PCBN material.

3. The FSW tool of claim 2 wherein the second PCBN material comprises cBN grains having a grain size in the range of 10 to 50 microns and wherein the first PCBN material comprises cBN grains having a grain size in the range of 2 to 30 microns.

4. The FSW tool of claim 2 wherein each of said first and second PCBN materials comprise a second phase comprising at least one of a ceramic or oxide phase, wherein the second phase of the second PCBN material is different from the second phase of the first PCBN material.

5. The FSW tool of claim 2 wherein each of said first and second PCBN materials comprises in the range of 80% to 95% by volume cBN.

6. The FSW tool of claim 1 wherein the first PCBN material comprises coarser cubic boron nitride (cBN) grains than the second PCBN material.

7. The FSW tool of claim 6 wherein the second PCBN material comprises cBN grains having a grain size in the range of 2 to 30 microns and wherein the first PCBN material comprises cBN grains having a grain size in the range of 10 to 50 microns.

8. The FSW tool of claim 6 wherein each of said first and second PCBN materials comprise a second phase comprising at least one of a ceramic or oxide phase, wherein the second phase of the second PCBN material is different from the second phase of the first PCBN material.

9. The FSW tool of claim 6 wherein each of said first and second PCBN materials comprises in the range of 80% to 95% by volume cBN.

10. The FSW tool of claim 1 wherein the first PCBN material comprises a first layer and second layer, wherein the first layer comprises coarser cubic boron nitride (cBN) grains than the second layer, wherein the pin extends from the first layer.

11. The FSW tool of claim 10 wherein the second layer comprises a ceramic second phase.

12. The FSW tool of claim 10 wherein the pin and the first layer comprise the same HPHT sintered PCBN material.

13. The FSW tool of claim 12 wherein the second PCBN material and the second layer comprise cBN grains having a grain size in the range of 10 to 50 microns and wherein the second layer comprises cBN grains having a grain size in the range of 2 to 30 microns.

14. The FSW tool of claim 12 wherein said second layer comprises in the range of 50% to 80% by volume cBN.

15. The FSW tool of claim 12 wherein said first layer and said second PCBN material each comprise in the range of 80% to 95% by volume cBN.

16. The FSW tool of claim 15 wherein said second layer comprises in the range of 50% to 80% by volume cBN.

17. The FSW tool of claim 1 wherein the base comprises a first portion.

18. The FSW tool of claim 17 wherein the first portion is integrally formed with the pin.

19. The FSW tool of claim 18 wherein the base comprises a second portion at least partially surrounding the first portion.

20. The FSW tool of claim 19 wherein the second portion is ring shaped.

21. The FSW tool of claim 20 wherein said pin has a diameter and said base first portion has a diameter equal to the pin diameter.

22. The FSW tool of claim 20 wherein said pin has a diameter and said base first portion has a diameter greater than the pin diameter.

23. The FSW tool of claim 19 wherein the first portion and the pin are formed from the same material.

24. The FSW tool of claim 23 wherein the first portion and the pin are formed from the second PCBN material and the second portion is formed from the first PCBN material.

25. The FSW tool of claim 23 wherein the second PCBN material comprises cBN grains having a grain size in the range of 10 to 50 microns and wherein the first PCBN material comprises cBN grains having a grain size in the range of 2 to 30 microns.

26. The FSW tool of claim 23 wherein said first PCBN material comprises in the range of 50% to 80% by volume cBN.

27. The FSW tool of claim 23 wherein said second PCBN material comprises in the range of 60% to 95% by volume cBN.

28. The FSW tool of claim 27 wherein said first PCBN material comprises in the range of 50% to 80% by volume cBN.

29. The FSW tool of claim 27 wherein said second PCBN material comprises a ceramic binder phase.

30. The FSW tool of claim 19 wherein the entire tool is integrally formed.

31. The FSW tool of claim 19 wherein the second portion is formed from the first PCBN material.

* * * * *